United States Patent
Ishida

(10) Patent No.: US 6,454,271 B2
(45) Date of Patent: Sep. 24, 2002

(54) COMBINED OIL RING

(75) Inventor: Masao Ishida, Suwa (JP)

(73) Assignee: Teikoku Piston Ring Co., Ltd., Tokyo (JP)

( * ) Notice: Subject to any disclaimer, the term of this patent is extended or adjusted under 35 U.S.C. 154(b) by 0 days.

(21) Appl. No.: 09/748,014

(22) Filed: Dec. 27, 2000

(30) Foreign Application Priority Data

Jan. 20, 2000 (JP) ........................................ 2000-011529

(51) Int. Cl.$^7$ .................................................. F16J 9/06
(52) U.S. Cl. ..................... 277/434; 277/438; 277/460; 277/474; 277/480; 277/442
(58) Field of Search ................................. 277/434, 438, 277/439, 459, 460, 467, 472, 474, 477, 480, 444, 443, 442

(56) References Cited

U.S. PATENT DOCUMENTS

| | | | | |
|---|---|---|---|---|
| 3,000,678 A | * | 8/1961 | Braendel ..................... | 277/473 |
| 4,108,448 A | | 8/1978 | Anderson et al. ........... | 277/157 |
| 4,210,338 A | * | 7/1980 | Collings, Jr. ................ | 277/472 |
| 4,497,497 A | * | 2/1985 | Berti et al. .................. | 277/463 |
| 5,195,758 A | * | 3/1993 | Erway ......................... | 277/480 |
| 5,718,437 A | * | 2/1998 | Tanaka et al. ............... | 277/443 |

FOREIGN PATENT DOCUMENTS

| | | |
|---|---|---|
| JP | 47-31927 | 9/1972 |
| JP | 62-8673 | 2/1987 |

* cited by examiner

*Primary Examiner*—Anthony Knight
*Assistant Examiner*—Michael W White
(74) *Attorney, Agent, or Firm*—Armstrong, Westerman & Hattori, LLP

(57) ABSTRACT

A combined oil ring is comprised of an oil ring and an expander. The cross section of the oil ring is a generally I-shape, and the outer circumferential surfaces of outer rail portions form sliding surfaces to make contact with the cylinder wall surface. The cross section of an expander installation groove formed on the inner circumferential surface of the oil ring is formed in a rectangular shape, and an expander formed of axially corrugated ring-shaped plate material is mounted in the expander installation groove. The expander is formed by forming a rectangular cross sectional plate material in a corrugated shape in the direction of plate thickness and further forming in a ring shape. The expander installation groove of the oil ring is not limited to a rectangular shaped cross section. For example, the cross section of the expander installation groove may have a trapezoidal shape widening towards the inner circumference, and the cross section of the plate material forming the expander may have a generally diamond-shaped cross section.

9 Claims, 3 Drawing Sheets

COMBINED OIL RING

BACKGROUND OF THE INVENTION

1. Field of the Invention

The present invention relates to a combined oil ring for oil control which is installed in pistons such as mounted in internal combustion engines and compressors.

2. Description of the Related Art

The two-piece type combined oil ring described below is known in the technology of the prior art with an expander installed on the inner circumferential side of the oil ring to increase the contact pressure on the oil ring sliding surfaces and improve oil scrape-off performance.
(1) One combined oil ring is constituted as follows: a groove 13A is formed in the inner circumferential surface of an oil ring 1A, and a coil expander 2A formed of steel wire wound in a coil shape is mounted in the groove 13A (see FIGS. 4A and 4B). This type of combined oil ring is generally utilized as a two-piece type combined oil ring.
(2) In another combined oil ring (see Japanese Patent Publication No. 62-8673), a groove is formed in the inner circumferential surface of an oil ring, a U-shaped cross section expander is installed in the groove, and the legs of the U-shaped cross section make pressing contact with the oil ring groove.
(3) In still another combined oil ring (see Japanese Utility Model Publication No. 47-31927), a groove is formed in the inner circumferential surface of an oil ring, an expander with a U-shaped or V-shaped (turned 90 degrees) or semi-circular shaped cross section is installed in the groove, and an outward protruding portion of the expander cross section makes pressing contact with the oil ring groove.

Recently, increasing demands are being made to make pistons lighter in weight and make piston rings with a smaller axial dimension to attain higher performance in terms of reduced friction and reduced lubricating oil consumption in automobile engines. Oil rings in particular have an expander installed in their inner circumferential side to maintain sufficient tension on the cylinder bore, so that compared to compression rings, oil rings usually have a larger axial width of 3.0 to 4.0 mm, and thus require a smaller axial dimension.

However, in the two-piece type combined oil ring with a coil expander or U-shaped cross section expander of the prior art, making the expander smaller in the axial dimension is difficult. Also, when made axially smaller, an adequate tension is difficult to achieve. The axial dimension of oil rings utilizing such expanders is limited to approximately 2.0 mm for oil rings with coil expanders and approximately 2.5 mm for oil rings with U-shaped cross section expander.

SUMMARY OF THE INVENTION

In view of the circumstances of the related art, the present invention therefore has the object of providing a two-piece type combined oil ring smaller in the axial dimension and having superior oil scrape-off performance.

To resolve the problems with the related art, a two-piece type combined oil ring of the present invention comprises an oil ring, and an expander installed in a groove formed on the inner circumferential surface of the oil ring to force the oil ring radially outwards, wherein the expander is formed of ring-shaped plate material corrugated in the axial direction.

The expander is formed of ring-shaped plate material corrugated in the axial direction, so that even when made axially smaller, the expander still has adequate spring force and is capable of attaining high tension. An oil ring with a smaller axial dimension is effective in reducing the piston length and making the piston lighter and more compact. Making the axial dimension smaller also increases the ring flexibility, improves the conformability with the cylinder bore and reduces consumption of lubricating oil. Even when made smaller in the axial dimension, a high tension can be obtained from the axially corrugated expander, so that the consumption of lubricating oil can be reduced even further. The expander is installed within the oil ring groove, so that movement of the expander is restricted and breakage is prevented.

There are no particular restrictions on the cross section of the groove formed on the inner circumferential surface of the oil ring, however, the groove may for instance be formed in a rectangular or trapezoidal shaped cross section. The expander preferably makes pressing contact with the bottom of the oil ring groove in order to obtain the tension which is stable and without variations.

The curvature radius on the corner of the expander which faces the corner at the bottom of the groove is preferably larger than the curvature radius of the corner at the bottom of the groove formed in the inner circumferential surface of the oil ring. The larger curvature radius is preferable for the expander to make pressing contact with the bottom of the oil ring groove stably.

The axial width of the oil ring is preferably 1.0 to 3.0 mm, and more preferably 1.0 to 2.0 mm in order to attain a smaller axial dimension.

The curvature radius of the corner in the bottom of the groove formed in the inner circumferential surface of the oil ring, and the curvature radius of the corresponding opposite corner of the expander are preferably each 0.1 to 1.0 mm in order to obtain the oil ring with a smaller axial dimension.

When the cross section of the groove of the oil ring is for example a rectangular cross section, the upper and lower surfaces of the groove are preferably formed horizontally, and the corresponding opposite upper and lower surface portions of the expander are also preferably formed horizontally. When the cross section of the groove of the oil ring is for example a trapezoidal cross section, the upper and lower surfaces of the groove are preferably formed as tapered surfaces widening towards the inner circumference, and the corresponding opposite upper and lower surface portions of the expander are also preferably formed as tapered surfaces widening towards the inner circumference. Forming the upper and lower surfaces as tapered surfaces in this way is designed to increase the strength of the upper section and the lower section of the oil ring groove.

The oil ring usually has one or two rails forming the outer circumferential sliding surfaces.

Preferably, the oil ring is nitrided or formed with a physical vapor deposition film on the outer circumferential sliding surfaces after nitriding. Also, the expander is preferably nitrided or subjected to electroless nickel plating or chromium plating. The above surface treatments improve the resistance to wear and also maintain satisfactory performance in lubricating oil consumption, etc. for a long period of time. Performing heat treatment such as nitriding prevents a decline in the tension due to rising temperatures during engine operation.

The difference in diameter (roundness) of the expander between the butt ends direction and the butt ends right-angle direction is preferably within 5 mm. The above roundness allows the expander to fit tightly in the oil ring groove, and prevents problems such as slipping or catching due to the expander sticking out of the groove, during installing in the piston or insertion into the cylinder.

BRIEF DESCRIPTION OF THE DRAWINGS

The aforesaid and other objects and features of the present invention will become more apparent from the following detailed description and the accompanying drawings.

DESCRIPTION OF THE PREFERRED EMBODIMENTS

Figure 1A:
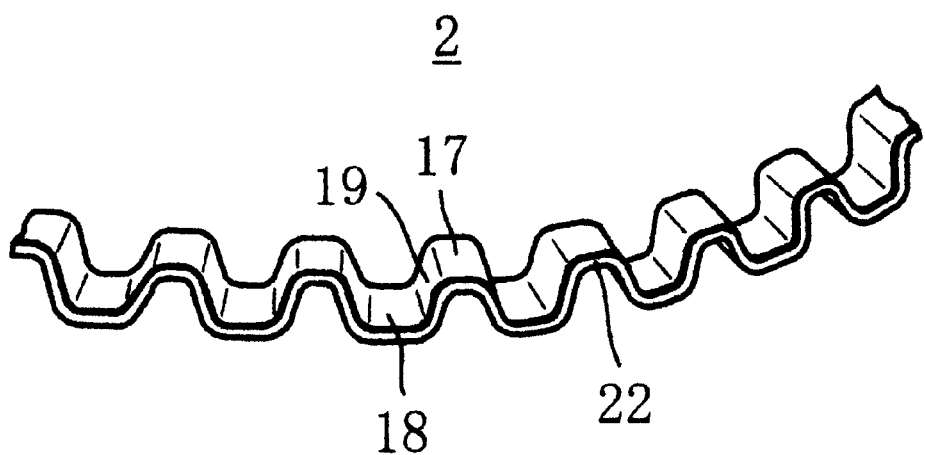
FIG. 1A is a perspective view showing a portion of the expander of the present invention.
Figure 1B:
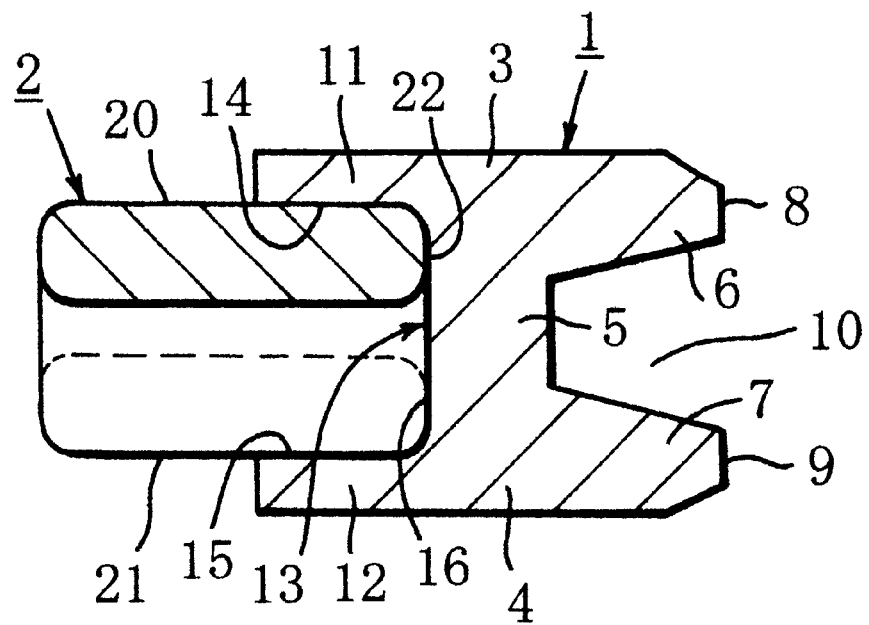
FIG. 1B is a longitudinal cross sectional view of the combined oil ring showing one preferred embodiment of the present invention.

The first embodiment of the present invention is explained next while referring to FIG. 1A and FIG. 1B.

A combined oil ring is a two-piece type ring comprised of a steel oil ring 1, and an axial corrugated expander 2.

The oil ring 1 has a generally I-shaped cross section and has butt ends. The oil ring 1 is comprised of upper and lower rails 3 and 4 and a thin straight web 5 connecting the rails 3 and 4. The web 5 has no oil holes formed to let oil escape. The outer circumferential surfaces of outer rail portions 6 and 7 protruding into the outer circumferential side on the upper and lower rails 3 and 4 are formed with sliding surfaces 8 and 9 which make contact with the cylinder wall surface. A space 10 between the outer rail portions 6 and 7 constitutes a receiving section for the lubricating oil scraped from the cylinder wall surfaces by the outer rail portions 6 and 7. Steel (for instance, stainless steel or low-chromium steel etc.) is used as the material for the oil ring 1, and surface treatment (such as nitriding or forming a physical vapor deposition film on the outer circumferential sliding surfaces after nitriding) is performed. The axial width of the oil ring 1 is 1.5 mm.

An expander installation groove 13 is formed by the web 5 and inner rail portions 11 and 12 protruding into the inner circumferential side on the upper and lower rails 3 and 4. The expander installation groove 13 has a rectangular shaped cross section, and is formed by horizontal upper and lower surfaces 14 and 15 and a perpendicular bottom surface 16. The expander 2 is mounted in the expander installation groove 13.

The expander 2 has butt ends and is formed of ring-shaped plate material corrugated in the axial direction. The expander 2 is comprised of horizontal upper and lower pieces 17 and 18 positioned at intervals in the axial direction and formed alternately along the periphery, and a connecting piece 19 joining the adjacent ends of the upper piece 17 and the lower piece 18. The expander 2 is formed by forming a rectangular cross sectional plate material in a corrugated shape in the direction of plate thickness and further forming in a ring shape. The upper and lower surfaces 20 and 21 of the expander 2 installed in the expander installation groove 13 of the oil ring 1 therefore form a horizontal surface, and the outer circumferential surface 22 which makes pressing contact with the bottom surface 16 of the expander installation groove 13 of the oil ring 1 forms a perpendicular surface. Steel (for instance carbon tool steel, spring steel, stainless steel, or chromium steel, etc.) is used as the material for the expander 2, and surface treatment (such as nitriding or electroless nickel plating or chromium plating) is performed. The expander omitting the processing for surface treatment may also be used.

The corners formed by the upper and lower surfaces 14 and 15 and the bottom surface 16 of the expander installation groove 13 of the oil ring 1 have a curvature radius of 0.2 mm. The corresponding opposite corners of the expander 2 or in other words, the corners formed by the upper and lower surfaces 20 and 21 and the outer circumferential surface 22 of the expander 2 have a curvature radius of 0.3 mm. The curvature radius of the corner of the expander 2 can be formed in a process to form the wire material or can be formed by machine tool processing.

Therefore, the expander 2 installed in the expander installation groove 13 of the oil ring 1 generates a radial outwardly expanding force caused by compression on the periphery, and the sliding surfaces 8 and 9 of the oil ring 1 are made pressing contact with the cylinder wall surface by the pressure of the outer circumferential surface 22 of the expander 2 on the bottom surface 16 of the expander installation groove 13.

The expander 2 is formed of ring-shaped plate material corrugated in the axial direction, so that even when made smaller in the axial dimension, sufficient spring force can be obtained and a high tension can be produced. Making the axial dimension smaller also increases the flexibility of the ring, improves the conformability with the cylinder bore and reduces consumption of lubricating oil. Even when made smaller in the axial dimension, a high tension can be obtained from the axially corrugated expander 2, so that the consumption of lubricating oil can be reduced even further. The expander 2 is installed within the expander installation groove 13 of the oil ring 1, so that movement of the expander 2 is therefore restricted and breakage is prevented. The expander 2 makes pressing contact with the bottom surface 16 of the expander installation groove 13, so that a stable tension without variations can be obtained.

Figure 2:
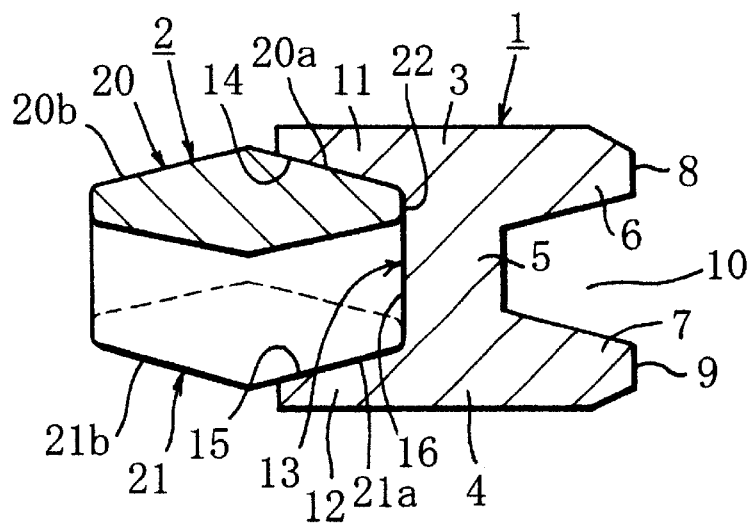
FIG. 2 is a longitudinal cross sectional view of the combined oil ring showing another preferred embodiment of the present invention.

A view of the second embodiment of the present invention is shown in FIG. 2. The second embodiment differs from the first embodiment in the cross sectional shape of the expander installation groove formed in the oil ring and the cross sectional shape of the plate material forming the expander. The other structure is the same as the first embodiment. Only the points differing from the first embodiment are explained below.

More specifically, in the second embodiment, the cross section of the expander installation groove 13 formed on the inner circumferential surface of the oil ring 1 is formed in a trapezoidal shape. The expander installation groove 13 is formed of the upper and lower surfaces 14 and 15 constituting a tapered surface widening towards the inner circumference, and the bottom surface 16 constituting a perpendicular surface.

The plate material forming the expander 2 on the other hand, has a cross section in generally a diamond shape. This generally diamond-shaped cross section has a cross sectional shape in which both ends in a diamond shape elongating laterally are cutted in a direction perpendicular to a horizontal diagonal and the cutted surfaces form a perpendicular plane. The expander 2 of the second embodiment also has a corrugated shape in the direction of plate thickness of the diamond cross sectional plate material, the same as in the first embodiment, and is formed in a ring shape, so that the upper and lower surfaces 20 and 21 of the expander 2 are comprised of tapered surfaces 20a and 21a widening towards the inner circumference from the outer circumferential end, and tapered surfaces 20b and 21b contracting towards the inner circumference from the inner circumferential end of the tapered surfaces 20a and 21a, and the outer circumferential surface 22 which makes pressing contact with the bottom surface 16 of the expander installation groove 13 of the oil ring 1 forms a perpendicular surface. On the upper and lower surfaces 20 and 21, the taper angle of the tapered surfaces 20a and 21a widening towards the inner circumference may be formed to the same or a smaller angle than the taper angle of the upper and lower surfaces 14 and 15 of the expander installation groove 13. The taper angle versus the horizontal plane of the upper and lower surfaces 14 and 15 of the expander installation groove 13 may for example be set at 10 degrees, and the taper angle of the corresponding opposite taper surfaces 20a and 21a on the upper and lower surfaces 20 and 21 of the expander 2 may also be set at 10 degrees. The corners formed by the bottom surface 16 and the upper and lower surfaces 14 and 15 of the expander installation groove 13 of the oil ring 1 have a curvature radius of 0.2 mm. The corresponding opposite-corners of the expander 2 or in other words, the corners formed by the upper and lower surfaces 20 and 21 and the outer circumferential surface 22 of the expander 2 have a curvature radius of 0.3 mm.

Therefore, the same as in the first embodiment, the expander 2 installed in the expander installation groove 13 of the oil ring 1 generates a radial outwardly expanding force due to being compressed on the periphery, and the sliding surfaces 8 and 9 of the oil ring 1 are made pressing contact with the cylinder wall surface by the outer circumferential surface 22 of the expander 2 making pressing contact on the bottom surface 16 of the expander installation groove 13. Then, the tapered surfaces 20a and 21a widening towards the inner circumference on the upper and lower surfaces 20 and 21 of the expander 2 are disposed in the expander installation groove 13 of the oil ring 1, and the outer circumferential surface 22 makes pressing contact with the bottom surface 16 of the expander installation groove 13. The tapered shape of the upper and lower surfaces 14 and 15 of the expander installation groove 13 of the oil ring 1, and the tapered shape on the corresponding opposite upper and lower surfaces 20 and 21 (tapered surfaces 20a and 21a ) of the expander 2 are designed to increase the strength of the base section of the inner rail portions 11 and 12 protruding into the inner circumferential side of the oil ring 1.

The examples given in the above first and second embodiments had no oil escape holes in the web 5 of the oil ring 1. However, oil escape holes may of course be formed in the web 5. Whether or not to form oil escape holes in the web 5 should be decided while considering factors such as the axial dimension of the ring.

Hereafter, the test for measuring oil consumption by utilizing a 1.5 liter diesel engine is described next.

The combined oil ring used in the test is as follows.

Comparative Example 1

Ring axial dimension: 3.0 mm
Expander: coil expander
Expander tension: 12N

Comparative Example 2

Ring axial dimension: 2.0 mm
Expander: coil expander
Expander tension: 12N

Embodiment 1

Ring axial dimension: 2.0 mm
Expander: axial corrugated expander described in the first embodiment
Expander tension: 15N Embodiment 2

Figure 3:
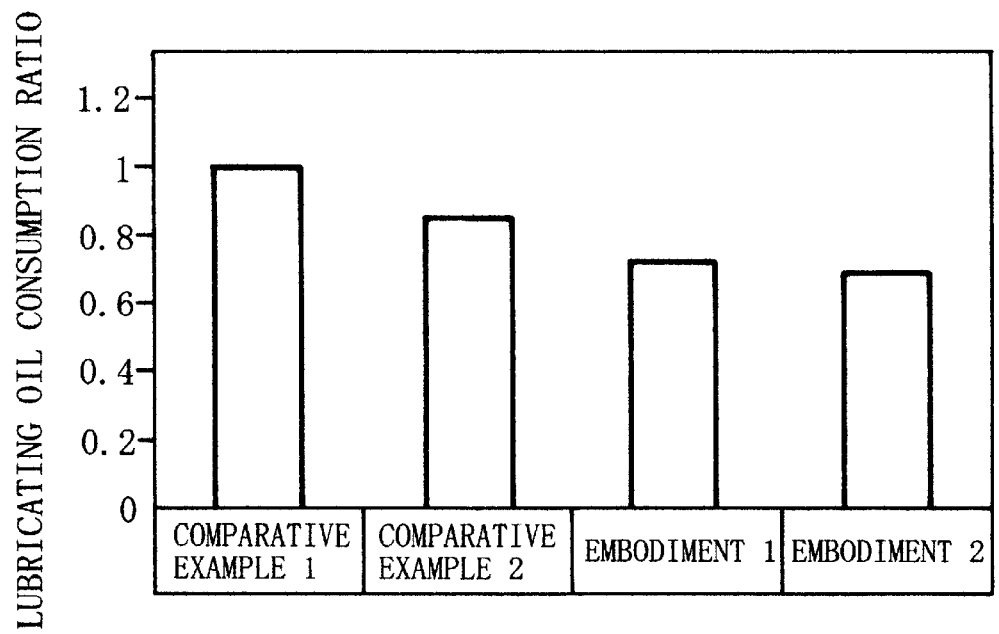
FIG. 3 is a graph showing the results of the lubricating oil consumption test.
Figure 4A:
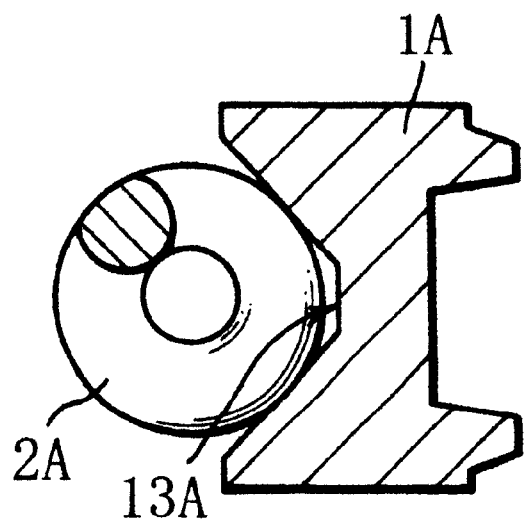
FIG. 4A is a longitudinal cross sectional view of the combined oil ring of the prior art.
Figure 4B:
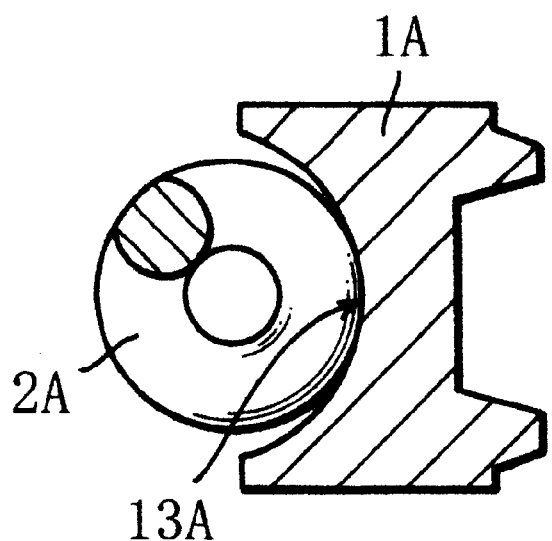
FIG. 4B is a longitudinal cross sectional view of another combined oil ring of the prior art.

Ring axial dimension: 1.5 mm
Expander: axial corrugated expander described in the first embodiment Expander tension: 12N The test results are as shown in FIG. 3.

When compared with the comparative example 1, oil consumption was found to be lower in the comparative example 2 due to the effect of the smaller axial dimension. However, there is a limit in reducing axial dimension and increasing tension in the combined oil ring with a coil expander of the prior art. Therefore, any further improvement in oil consumption performance cannot be expected. In contrast, in the combined oil ring of the present invention, a reduced oil consumption can be seen in the results for the first embodiment on account of the ring axial dimension of 2.0 mm and increased tension. Further, reduced oil consumption can be obtained in the second embodiment by reducing the axial dimension of the ring to 1.5 mm without increasing the tension.

Although the present invention has been described with reference to the preferred embodiments, it is apparent that the present invention is not limited to the aforesaid preferred embodiments, but various modifications can be attained without departing from its scope.

What is claimed is:

1. A combined oil ring of two pieces comprising an oil ring, and an expander installed in a groove formed on the inner circumferential surface of said oil ring to force said oil ring radially outwards, wherein said expander is formed of ring-shaped plate material corrugated in the axial direction in a cross section taken along a circumferential direction, wherein said expander makes pressing contact on a bottom of the groove formed on the inner circumferential surface of said oil ring, and wherein the curvature radius on the corner of said expander is greater than the curvature radius of the corresponding opposite corner at the bottom of the groove formed in the inner circumferential surface of the oil ring.

2. A combined oil ring as claimed in claim 1, wherein the axial dimension of said oil ring is 1.0 to 3.0 mm.

3. A combined oil ring as claimed in claim 2, wherein the curvature radius of the corner at the bottom of the groove formed in the inner circumferential surface of said oil ring, and the curvature radius of the corresponding opposite corner of said expander are 0.1 to 1.0 mm.

4. A combined oil ring as claimed in claim 1, wherein the upper and lower surfaces of the groove formed on the inner circumferential surface of said oil ring are formed in the radial direction, and the corresponding opposite upper and lower surface portions of said expander are formed in the radial direction.

5. A combined oil ring as claimed in claim 1, wherein the upper and lower surfaces of the groove formed on the inner circumferential surface of said oil ring are formed with a tapered surface widening towards the inner circumference, and the corresponding opposite upper and lower surface portions of said expander are formed with a tapered surface widening towards the inner circumference.

6. A combined oil ring as claimed in claim 1, wherein said oil ring comprises one or two rail sections having the outer circumferential sliding surface.

7. A combined oil ring as claimed in claim 1, wherein a nitrided layer is formed on said oil ring.

8. A combined oil ring as claimed in claim 7, wherein a physical vapor deposition film is formed on the outer circumferential sliding surface of said oil ring after nitriding.

9. A combined oil ring as claimed in claim 1, wherein a nitrided layer, electroless nickel plating or chromium plating is formed on said expander.

* * * * *

UNITED STATES PATENT AND TRADEMARK OFFICE
CERTIFICATE OF CORRECTION

PATENT NO.     : 6,454,271 B2                                        Page 1 of 1
DATED          : September 24, 2002
INVENTOR(S)    : Masao Ishida It is certified that error appears in the above-identified patent and that said Letters Patent is hereby corrected as shown below:

<u>Column 6,</u>
Lines 22-36,
Amend claim 1 as follows:

1. A combined oil ring of two pieces comprising an oil ring, and an expander installed in a groove having upper and lower surfaces and being formed on the inner circumferential surface of said oil ring to force said oil ring radially outwards,
    wherein said expander is formed of ring-shaped plate material corrugated in the axial direction forming an expander upper surface and an expander lower surface that are axially offset one from the other in a cross section taken along a circumferential direction,
    wherein said expander makes pressing contact on a bottom of the groove formed on the inner circumferential surface of said oil ring with the upper and lower surfaces of the expander being parallel with the respective upper and lower surfaces of the groove, and wherein the curvature radius on the corner of said expander is greater than the curvature radius of the corresponding opposite corner at the bottom of the groove formed in the inner circumferential surface of the oil ring.

Signed and Sealed this

Fifteenth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,454,271 B2
DATED        : September 24, 2002
INVENTOR(S)  : Masao Ishida It is certified that error appears in the above-identified patent and that said Letters Patent is hereby corrected as shown below:

Column 6,
Lines 22-36,
Amend claim 1 as follows:

1. A combined oil ring of two pieces comprising an oil ring, and an expander installed in a groove having upper and lower surfaces and being formed on the inner circumferential surface of said oil ring to force said oil ring radially outwards,
    wherein said expander is formed of ring-shaped plate material corrugated in the axial direction forming an expander upper surface and an expander lower surface that are axially offset one from the other,
    wherein said expander makes pressing contact on a bottom of the groove formed on the inner circumferential surface of said oil ring with the upper and lower surfaces of the expander being parallel with the respective upper and lower surfaces of the groove, and wherein the curvature radius on the corner of said expander is greater than the curvature radius of the corresponding opposite corner at the bottom of the groove formed in the inner circumferential surface of the oil ring.

This certificate supersedes Certificate of Correction issued April 15, 2003.

Signed and Sealed this

Thirtieth Day of September, 2003

JAMES E. ROGAN
*Director of the United States Patent and Trademark Office*